Jan. 3, 1961 K. WILFERT 2,966,952
INSTRUMENT PANEL, ESPECIALLY FOR MOTOR VEHICLES
Filed Dec. 10, 1956 2 Sheets-Sheet 1
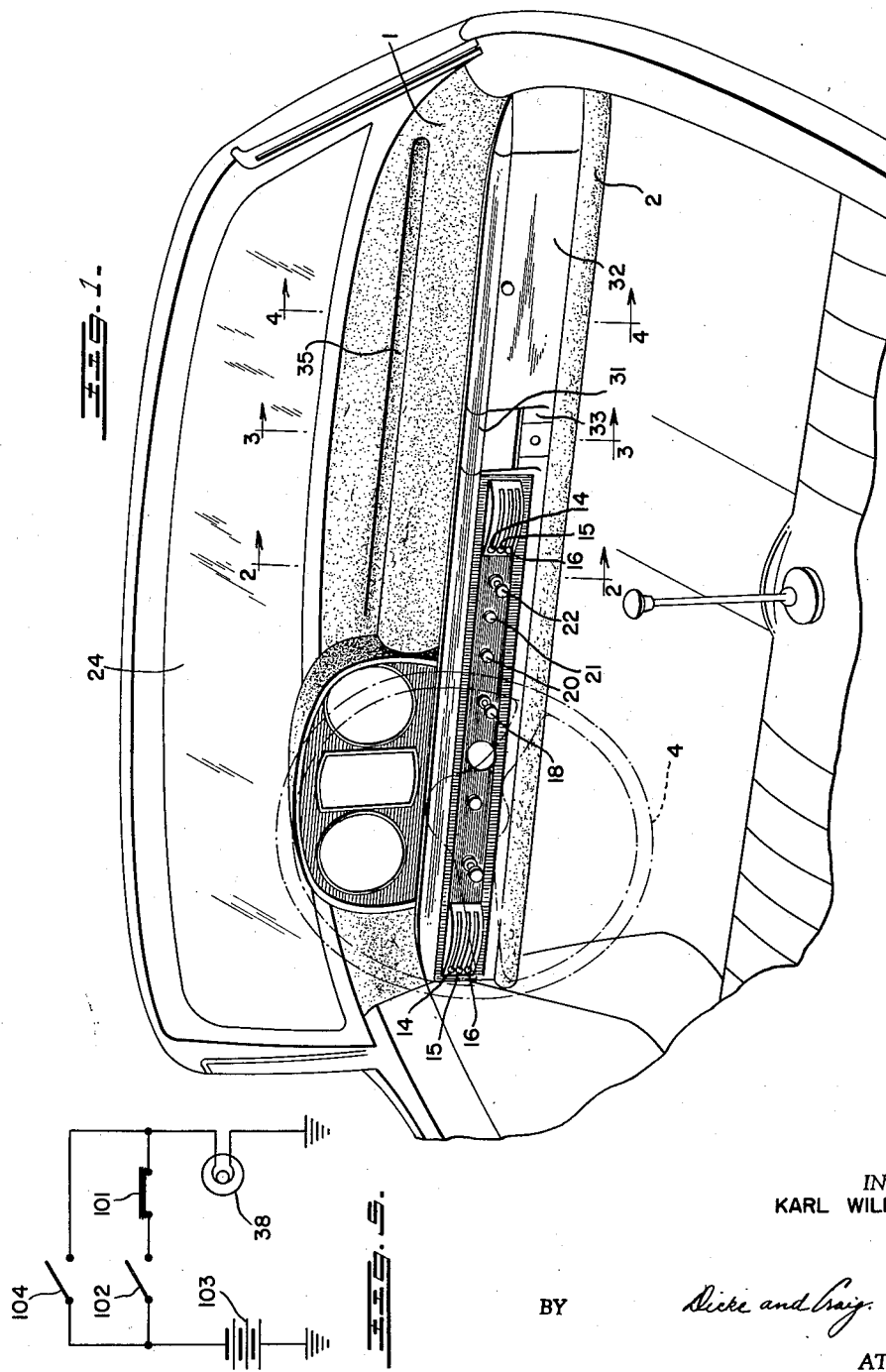
INVENTOR
KARL WILFERT
BY *Dicke and Craig*
ATTORNEYS

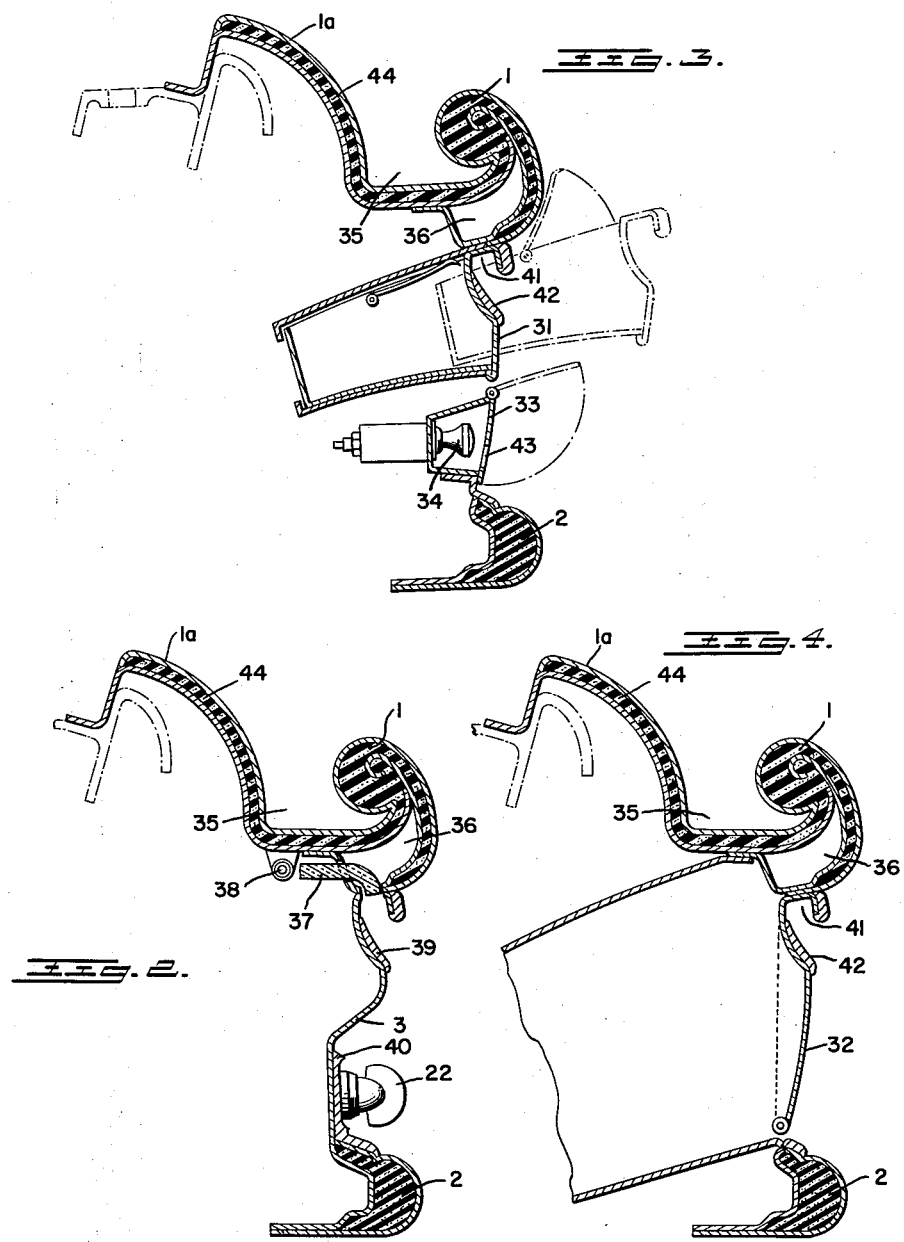

United States Patent Office 2,966,952
Patented Jan. 3, 1961

2,966,952

INSTRUMENT PANEL, ESPECIALLY FOR MOTOR VEHICLES

Karl Wilfert, Stuttgart-Degerloch, Germany, assignor to Daimler-Benz Aktiengesellschaft, Stuttgart-Unterturkheim, Germany Filed Dec. 10, 1956, Ser. No. 627,287

Claims priority, application Germany Dec. 8, 1955

8 Claims. (Cl. 180—90)

The present invention relates to an instrument board or panel, especially for motor vehicles, in which the individual instruments, actuating knobs and levers are combined in a ledge or strip-like instrument panel, which is disposed between two padding bulges arranged at an appropriate distance from one another, in a manner similar to that disclosed and described in my copending application, Serial No. 610,314, filed on September 17, 1956, and now Patent No. 2,855,066, entitled "Instrument Panels, Especially for Motor Vehicles."

The present invention essentially consists in that, in particularly, one of the padding bulges is formed as a handle, particularly in such a manner that the padding bulge which is disposed above the instrument panel extends up to the windshield of the vehicle and in that the handle or gripping pad is formed by a channel or groove arranged in the upper padding.

The handle or gripping pad is supported by a hollow section or profile in which a light source is accommodated which illuminates the instrument panel. In particular, a rod which is illuminated from behind and which distributes stray-light serves for that purpose, such rod being made, in particular, of synthetic material, such as, for example, polystyrene.

The handles of the lids or covers embedded in the instrument panel are formed as small channel-shaped sections which project behind the handle or gripping pad while the lower edge thereof which again projects forwardly, is covered with a light-reflecting strip. The stray-light rod which is disposed in the channel-shaped extension also illuminates the individual knobs with a soft light even with a completely dark interior of the vehicle body. This optical indication of the knobs may be further enhanced in that the knobs in their turn are provided again with a light ring which is either illuminated from behind or is lighted up by the stray-light of the aforementioned light source. In connection therewith, the arrangement may also be made in such a manner that the lights illuminating the light strip are controlled by means of a bimetallic switch, which, for example, cooperates with a door switch in such a manner that upon closure of the door the instrument panel is illuminated and such illumination is extinguished automatically after a predetermined time due to the action of the bimetallic switch.

For purposes of improving the stray-light effect, the light strip may also be provided with light refractive particles or also with small air bubbles, or the light strip may also contain a radioactive material which is excited by the stray-light and thereupon continues to give off light in the darkness by continuing glow.

Accordingly, it is an object of the present invention to provide an instrument panel arrangement for motor vehicles which assures safety to the drivers while at the same time protecting the individual knobs and levers as well as switches arranged thereat.

It is still another object of the present invention to provide an instrument panel which is disposed between two padded bulges in such a manner that the upper padded bulge extends up to the windshiled of the vehicle and forms a handle which may be gripped by the driver.

Still another object of the present invention resides in the arrangement of a lighting or illumination system for the instrument panel which provides a soft light by the use of stray-light reflected from a light strip.

A still further object of the present invention is to provide an instrument panel arrangement in which the various parts, particularly the sheet metal parts forming the covers or lids of the various compartments are formed in such a manner as to provide handles while at the same time cooperating with the illumination system for the instrument panel to provide good lighting at all times.

A still further object of the present invention is to provide a lighting system for an instrument panel which is actuated automatically upon closure of the door and which will be de-energized or extinguished by the use of a time-delay switch, such as a bimetallic switch, which de-energizes the instrument lights a predetermined time after closure of the door.

These and other objects, features and advantages of the present invention will become more obvious from the following description when taken in connection with the accompanying drawing, which shows, for purposes of illustration only, one embodiment in accordance with the present invention, and wherein:

Figure 1 is a perspective view of the instrument panel including windshield and steering wheel of the vehicle in accordance with the present invention;

Figure 2 is an enlarged cross-sectional view taken in the plane 2—2 of Figure 1;

Figure 3 is an enlarged cross-sectional view taken in the plane 3—3 of Figure 1;

Figure 4 is an enlarged cross-sectional view taken in the plane 4—4 of Figure 1; and Figure 5 is a schematic wiring diagram of the lighting system for the instrument panel in accordance with the present invention.

Referring now more particularly to the drawing wherein like reference numerals are used to designate like parts in the various views thereof, of which Figure 1 is drawn to a slightly smaller scale than Figures 2 through 4, reference numeral 3 designates an instrument panel in the form of a small ledge or strip which is arranged between two padding bulges 1 and 2. The control members 14, 15 and 16 which form the control members for the heating and ventilating system of the vehicle are arranged to the right and to the left of the steering wheel 4. The switch 18 serves, for example, for purposes of controlling the interior and external lights of the vehicle, the switch 20, for example, for purposes of controlling an additional spring, while reference numeral 21 designates, for example, the ignition key and reference numeral 22 a draw or pull-out knob for a third signal horn.

An ash tray provided with a lid or cover 31 is arranged to the right of the right cluster of heating and ventilating control members 14, 15 and 16. The glove compartment with the cover or lid 32 in turn is arranged to the right of the ash tray 31. The lids 31 and 32 of the ash tray and glove compartment respectively are embedded in the ledge or strip 3 of the instrument panel. A pivotal lid 33 is disposed below the lid 31 of the ash tray which, for example, covers the starter button 34 (Figure 3).

According to the present invention, a deep groove or channel 35 is provided in the upper padding which extends up to the windshield 24. The channel 35 separates the part of the padding 1 which is disposed closest to the instrument panel ledge 3 from the forwardly curved wall part 1a which is disposed closer toward the windshield 24 in the form of a handle-like ledge. This padded handle 1 is supported by an essentially vertically and backwardly projecting hollow section or profile reinforcing support member 36 (Figure 2) of the dashboard while, for example, a light-transparent profile rod 37 is arranged in the region above the knobs 18, 20 and 22. The rear edge of this profile rod 37, i.e., the edge thereof which extends underneath the padding 1 in a forward direction of the vehicle is illuminated by a light source 38 formed, for example, by a small filament or glow type lamp or by a rod-type light. The forward end of the profile rod 37, i.e., the end thereof which extends in a rearward direction of the vehicle, throws this light on a light-reflecting strip, for example, a chromed strip 39. As a result thereof, so much stray light is produced between the profile rod 37 and the strip 39 that the knobs 18, 20 and 22 which are disposed therebelow as well as the ignition key 21 are still illuminated to such an extend that they may be readily found in darkness.

As already mentioned, the illuminating intensity of the strips 37 and 39 may be further enhanced in that the actuating or switching knobs are provided with light rings 40 (Figure 2). The ring 40 may obtain its light either from the light rod 37 or may also be illuminated from behind. For increasing the stray-light effect the light rod 37 may also be provided with a luminous substance or it may also contain small air bubbles, metal particles, or foils at which the light which is emitted by the light source 38 is refracted or dispersed.

The light source or sources 38 may also be actuated by a bimetallic switch 101 (Figure 5) which forms a series circuit with door switch 102, battery 103 and lamp or lamps 38. The switch 102 may thereby be so arranged as to close the lighting series circuit including the bimetallic switch 101 already upon opening of the door or, in the alternative, preferably only upon closing of the door. A predetermined time after closing of switch 102, the bimetallic switch 101 will automatically open the circuit thereby extinguishing the lamp or lamps 38 a predetermined time after closure of the switch 102 sufficient to enable the driver to undertake all the conventionally necessary steps to start the engine and get the vehicle under way. After opening of bimetallic switch 101, only the usual relatively dim instrument or dial lights remain energized. Of course, a manual switch 104, controlled, for example, by the knob 20, may be arranged in parallel with the door-switch bimetallic switch circuit so as to bypass the same and to actuate or energize the instrument panel lighting system at will.

The lids 31 and 32 of the ash tray and glove compartment respectively are bent back upon themselves (Figures 3 and 4) at the upper edge thereof below the padded handle 1 into the form of a channel-shaped extension 41 which serves as gripping handle. A light reflecting strip, for example, a chromed strip 42 effective as a decorating strip, is arranged at the lower edge of the channel-shaped extension 41 forming part of the ash-tray lid 31. In a similar manner, the handle of the lid for the glove compartment 32 is provided with a light-reflecting strip 42 (Figure 4). It should be noted that the light-reflecting strips 39 and 42 are disposed at about the same height, i.e., form one continuous strip so that stray-light is reflected from all of these strips.

However, it is also understood that the arrangement may be made in such a manner, according to the embodiment illustrated in Figure 2, that slots are provided in the handle-shaped extensions 41 for the lids 31 and 32 behind which light rods are also disposed or over which the light rod 37 extends.

The pivotal lid 33 for the starter 34, which, for example, may be of the pull or draw type, is provided with an aperture 43 (Figure 3) for insertion therein of a finger in order to enable opening of the lid 33.

All of the aforementioned features contribute to the fact that the passengers seated in front of the instrument panel directly behind the windshield are protected against injury without in any way adversely affecting the possibility of ease of actuation and facility of over-all inspection of the vehicle actuating and control members, as well as of the indicating instruments. By the same token, the arrangement in accordance with the present invention is such that the actuating and control parts projecting away from the ledge 3 are protected against damages.

Any suitable known manner of padding may be used for the padded bulges in accordance with the present invention. In the illustrated embodiment, a foam rubber layer 44 is provided which is covered, for example, with a layer of leather, plastic material or textile material.

While I have shown and described one preferred embodiment in accordance with the present invention, it is understood that the same is not limited thereto but is susceptible of many changes and modifications in accordance with the present invention, and I intend to cover all such changes and modifications as defined by the appended claims.

I claim:

1. In a vehicle body having a windshield and instrument panel, a transverse padded bulge member disposed rearwardly of said windshield, said bulge member being formed as a hand gripping ledge, an essentially upwardly and rearwardly projecting support member supporting said bulge member, a forwardly curved padded wall disposed immediately to the rear of said windshield, said curved wall and said hand gripping ledge defining therebetween a groove also padded on the inside thereof, said support member being formed by a hollow sectioned sheet-metal member connected to said instrument panel, and light means disposed beneath said hand gripping ledge for illuminating said instrument panel, including a light-transmitting strip extending within said sheet metal member.

2. In a vehicle body having a door, a windshield and an instrument panel, a transverse padded bulge member disposed in said vehicle body to the rear of said windshield, said bulge member being formed as a hand gripping ledge, an essentially upwardly and rearwardly projecting support member supporting said bulge member, a forwardly curved padded wall disposed immediately to the rear of said windshield, said forwardly curved wall and said bulge member defining therebetween a groove also padded on the inside thereof and having a padded bottom wall, said support member being formed by a hollow sectioned sheet-metal member connected with said instrument panel, illuminating means including light-transmitting strips extending into said sheet metal member for illuminating said instrument panel and a light source supported by said bottom wall for illuminating said strips from behind, said strips being made of synthetic material provided with light-refractive means, and circuit means including a source of electric power, a door actuated switch, and a bimetallic switch operatively connected to said light source for energizing said illuminating means upon closure of said door and for automatically de-energizing said light source a predetermined time interval after closure of said door switch by the action of said bimetallic switch.

3. In a vehicle body as set forth in claim 2, further comprising lid means for at least one compartment provided with a channel-shaped extension along the upper edge thereof simultaneously forming a handle, the base portion of said channel-shaped member being provided with slit means to enable passage of light therethrough, and light-transmitting means forming part of said illuminating means and disposed above said slit means for illuminating said instrument panel through said slit means.

4. In a vehicle body having a windshield and instrument panel, passenger-protective and handle means comprising a transverse padded bulge member disposed rearwardly of said windshield, said bulge member being formed as a hand gripping ledge, an essentially upwardly and backwardly projecting support member supporting said bulge member, and a forwardly curved wall disposed immediately to the rear of said windshield, said hand gripping ledge and said curved wall defining a groove therebetween padded also on the inside thereof, said groove having a bottom wall, said support member being formed by a hollow sectioned sheet-metal strip contacted to said instrument panel, one side of said strip supporting said bottom wall, lid means in said instrument panel enclosing at least one compartment, said lid means being provided with a channel-shaped extension along the upper edge thereof formed as a handle and projecting rearwardly below said support member, the lower edge of said channel-shaped extension being provided with a light reflecting chromed strip, and means disposed below said bottom wall for illuminating said chromed strip.

5. In a motor vehicle body having a windshield and an instrument panel, a padded member adapted for protection of said instrument panel disposed above and protruding rearwardly beyond said panel, illuminating means for said instrument panel, and means for supporting said illuminating means connected to said padded member, a supporting member for said padded member, said supporting member being comprised in said means for supporting said illuminating means, said supporting member having an aperture therein adjacent said control panel for cooperation with said illuminating means, said illuminating means comprising a light source and a light-transparent plastic member adjacent said light source and having an edge extending into said aperture.

6. In a motor vehicle, the combination according to claim 5, wherein said light-transparent plastic member has a coating of a luminous substance.

7. In a motor vehicle body having a windshield and an instrument panel, a padded member adapted for protection of said instrument panel disposed above and protruding rearwardly beyond said panel, illuminating means for said instrument panel, and means for supportnig said illuminating means connected to said padded member, said illuminating means including an electrical light source, circuit means including a source of electrical power, a switch operatively connected to said source of electrical power and disposed within the range of movement of the vehicle door nearest to the vehicle operator and being closed upon closure of said door, a bimetallic switch operatively connected to said first-named switch and to said light source for energizing said light source upon closure of said door and for de-energizing said light source a predetermined time interval after closure of said first-named switch.

8. In a motor vehicle, the combination according to claim 7, wherein a further padded member is disposed at the lower edge of and protruding rearwardly below said instrument panel.

References Cited in the file of this patent

UNITED STATES PATENTS

| D. 182,011 | Wilfert | Jan. 28, 1958 |
| 2,066,021 | Tjaarda | Dec. 29, 1936 |
| 2,070,760 | Straith | Feb. 16, 1937 |
| 2,507,035 | Maynard | May 9, 1950 |
| 2,537,971 | Dames | Jan. 16, 1951 |
| 2,701,297 | Thibault | Feb. 1, 1955 |

FOREIGN PATENTS

| 1,115,317 | France | Dec. 26, 1955 |